United States Patent [19]
Wagner

[11] Patent Number: 6,089,428
[45] Date of Patent: Jul. 18, 2000

[54] BIKE RACK

[76] Inventor: John F. Wagner, 5790 Eber Rd., Whitehouse, Ohio 43571

[21] Appl. No.: 08/900,603

[22] Filed: Jul. 25, 1997

[51] Int. Cl.[7] .................................. B60R 9/06; B60R 9/10
[52] U.S. Cl. .......................... 224/401; 224/504; 224/506; 224/511; 224/532; 224/537; 224/924
[58] Field of Search ..................................... 224/924, 401, 224/511, 532, 531, 537, 509, 506, 504, 505

[56] References Cited

U.S. PATENT DOCUMENTS

| | | | |
|---|---|---|---|
| 3,765,581 | 10/1973 | Kosecoff | 224/924 |
| 5,190,195 | 3/1993 | Fullhart et al. | 224/924 |
| 5,236,110 | 8/1993 | Schmidt | 224/924 |

*Primary Examiner*—Linda J. Sholl
*Attorney, Agent, or Firm*—Jerry Semer

[57] ABSTRACT

The invention is a bicycle rack that attaches to the tongue of a tent camper. The bicycle rack is attached to the tent camper with two plates that are placed on the top and bottom of the tongue. Then a bolt is placed through openings in both plates and tightened to the plates against the tongue of the tent camper. The bicycles are supported by posts attached to the top plate over the top of the tongue. The two vertical posts are braced at the top. Extending from the two vertical posts are horizontal rods that the bicycle is placed over to ride upon the rack. Bicycles can be placed on both sides of the rack. When it is necessary to raise the tent camper, the bicycle rack can be moved into a horizontal position so that it will not affect the raising of the tent camper.

5 Claims, 5 Drawing Sheets

BIKE RACK

FIELD OF THE INVENTION

The present invention relates to a bicycle rack used in carrying bicycles on a tent camper and more particularly to a bicycle rack that attaches to the tongue of the tent camper.

BACKGROUND OF THE INVENTION

Bicycling has become a very popular recreation activity. Various racks have been proposed and made for carrying bicycles on a variety vehicles. There are numerous racks on the market that attach the bicycle to the front, back or top of the automobile. There are also various racks that attach bicycles to the front or back of a recreational vehicle. There are very few racks on the market, however, that attach bicycles to tent campers. These racks usually attach the bicycle either to the top of the tent camper or the back of the tent camper.

In order to attach a bicycle to the top of the tent camper, the bicycle rack usually puts openings in the top of the tent camper. These openings can, in the future, lead to problems such as leakage of the tent camper. Thus, one of the objectives of this invention is to create a bicycle rack that there is no necessity to damage or alter the tent camper in any way when attaching the rack to the camper. Inventor's improved bike rack attaches to the tongue of the tent camper. There is no necessity to drill or weld anything to the tent camper. There are no holes placed in the tent camper.

There are many bicycle racks that attach to a hitch of an automobile or a vehicle. Some of these are shown in U.S. Pat. No. 5,529,231 to Burgiss, U.S. Pat. No. 5,615,904 to Van Dusen, et. al., U.S. Pat. No. 5,004,133 to Wiler, U.S. Pat. No. 5,443,189 to Hershville, U.S. Pat. No. 5,518,159 to De Grava, and U.S. Pat. No. 5,497,927 to Peterson. The big disadvantage in these racks are they cannot be used when one is pulling his tent camper on the vehicle. There must be another means to carry the rack. Thus, one of the objectives of the invention is to devise a bicycle rack that can carry one's bicycles when one is pulling a tent camper.

SUMMARY OF THE INVENTION

The invention is a bicycle rack that attaches to the tongue of a tent camper. The bicycle rack is attached to the tent camper with two plates that are placed on the top and bottom of the tongue. Then bolts are placed through openings in both plates and tightened. This tightens the plates against the tongue of the tent camper. The bicycles are supported by two vertical posts attached to the top plate over the top of the tongue. The two vertical posts are braced at the top. Extending from the two vertical posts are horizontal rods that the bicycle is placed over to ride upon the rack. Bicycles can be placed on both sides of the rack. When it is necessary to raise the tent camper, the bicycle rack can be moved into a horizontal position so that it will not affect the raising of the tent camper.

DETAILED DESCRIPTION OF THE PREFERRED EMBODIMENT

Figure 1:
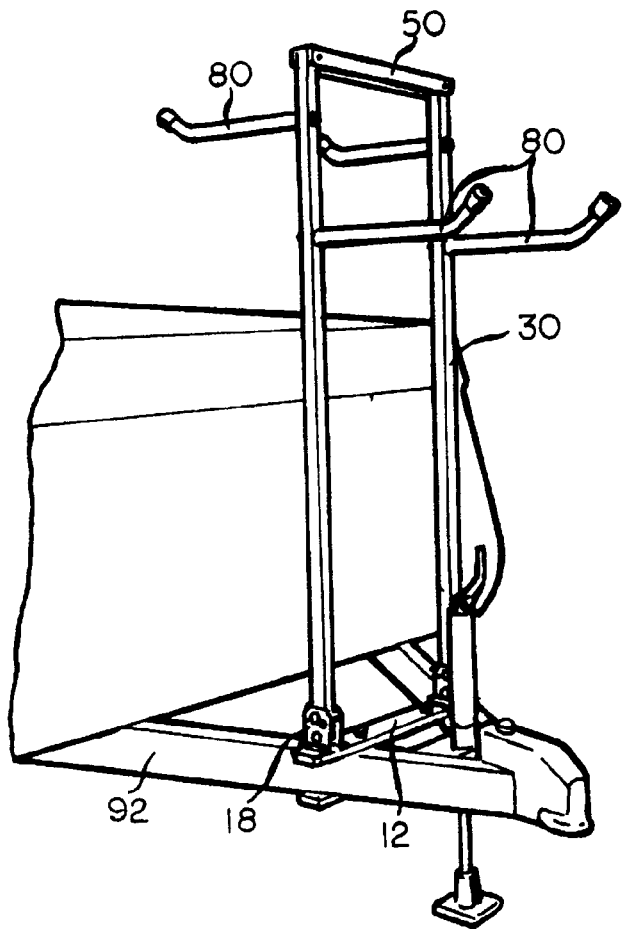
FIG. 1 is a perspective view of the invention attached to the tongue.
Figure 2:
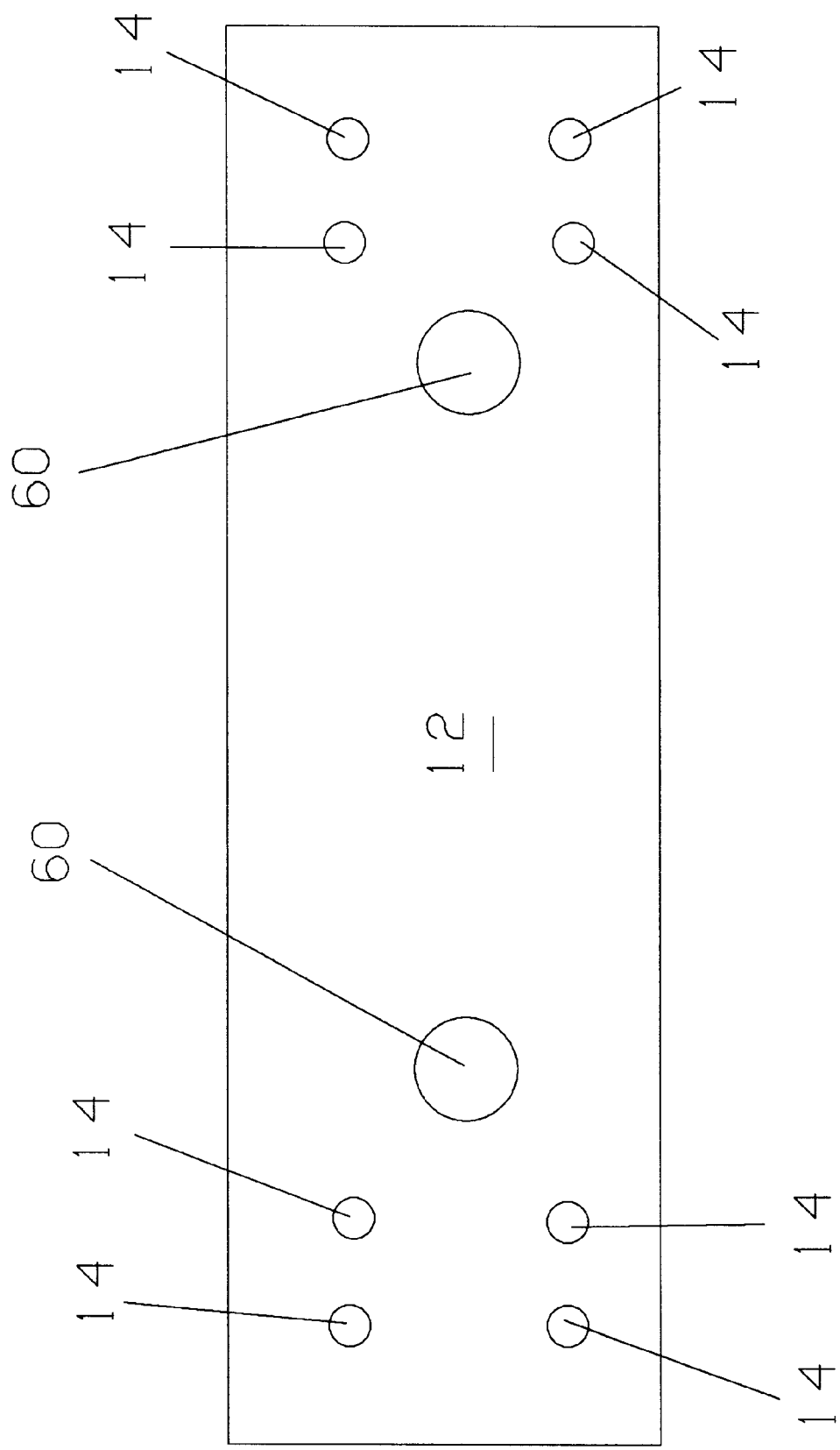
FIG. 2 is the top view of the base plate of the invention.
Figure 3:
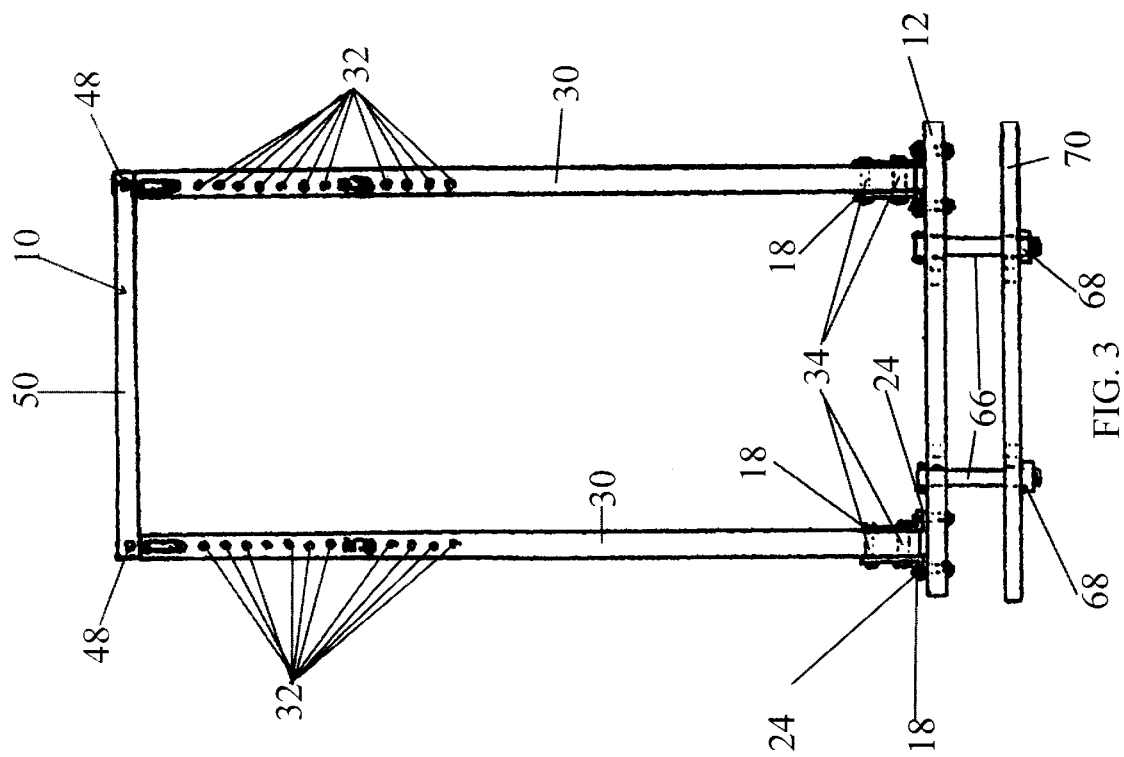
FIG. 3 is a front view of the invention.
Figure 4:
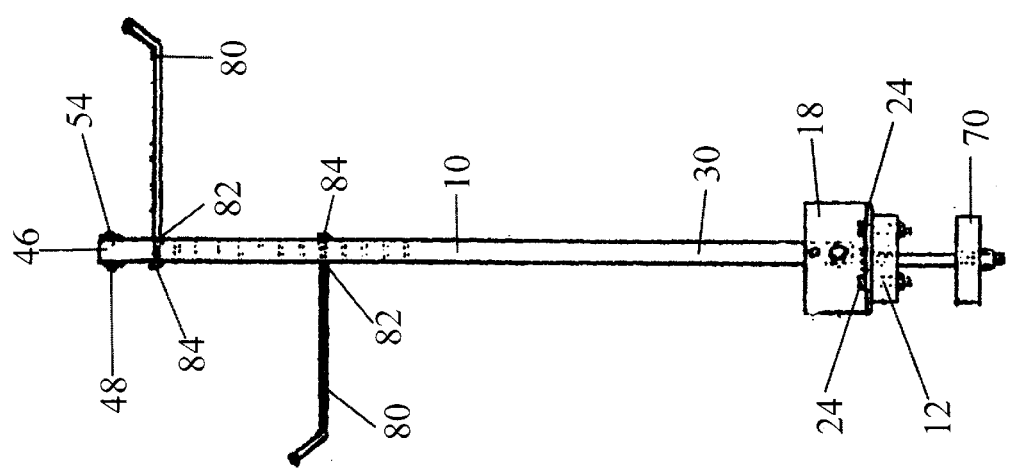
FIG. 4 is a side view of the invention.

FIG. 1 shows a perspective view of the invention. To make the invention, one starts with a base plate 12 shown in FIG. 1. FIG. 2 shows the base plate. In the preferred embodiment, base plate 12 is made out of ¾inch plate steel. As you can see from both FIG. 1 and FIG. 2, base plate 12 is rectangular. At each end of base plate 12, there are four openings 14 drilled. These openings 14 are adapted to take bolts 16. In FIG. 1, bolted to base plate 12 through the openings 14 at each end of the base plate 12 are mounting plates 18. In the preferred embodiment the mounting plates 18 are shaped in an L. On the foot of the L there are drilled two openings 20 that are adapted to fit bolts 16 which are used to bolt the mounting plate 18 on the base plate 12. FIGS. 3 and 4 the side view and the front view of the invention shows these mounting plates 18 in place. The two openings 20 on the mounting piece 18 are aligned with two of the base plate openings 14 as shown in FIG. 3 and FIG. 4. The four mounting plates 18 are mounted two on each end by bolting the mounting plates 18 to the base plate 12. The bolt 16 is placed through opening 14 in the base plate 12 and through the opening 20 in the foot of the mounting plate 18. The bolt passes all the way through opening 20 in the mounting plate 18 and a nut 24 is placed on the end. In the preferred embodiment bolt 16 head is spot welded in place to keep the head from turning in opening 14.

Figure 5:
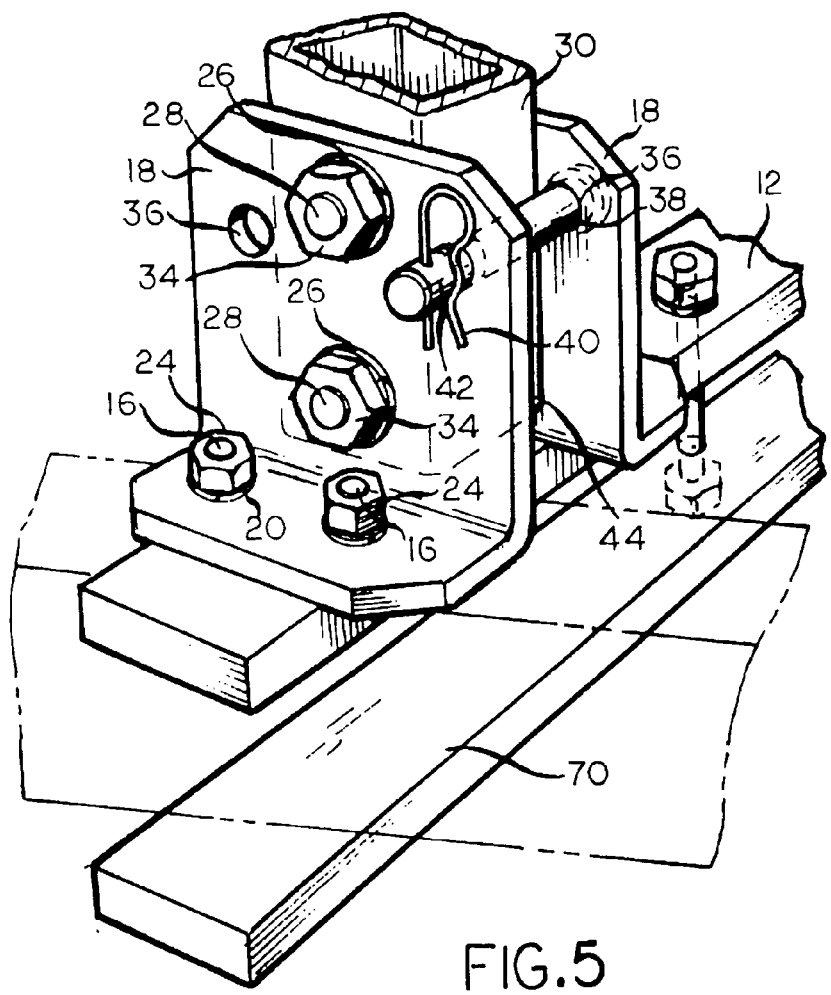
FIG. 5 is a view of the mounting plates, vertical posts, and base plate mounted as in the invention.
Figure 6:
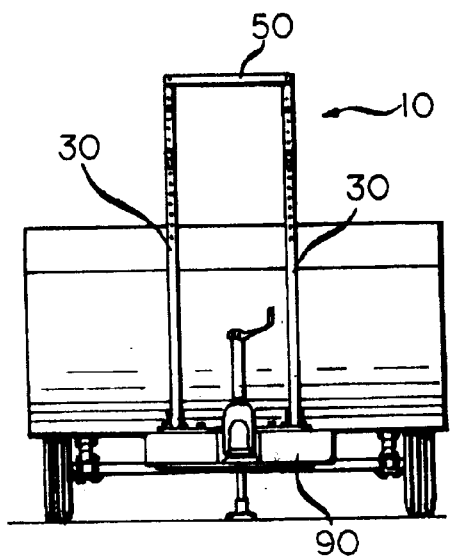
FIG. 6 is a front view of the invention attached to a tent camper.

The mounting plates 18 are placed upon the base plate 12 so that the distance between the two mounting plates 18 on each end of the base plate 12 is adapted to allow the vertical post 30 to fit within as shown in FIG. 5. The vertical posts 30 in the preferred embodiment are made out of square steel and is approximately 60 inches in length. At the top of the vertical post 30 are a set of openings 32. The set of openings 32 pass completely through the vertical posts 30. At the bottom of the vertical post 30 are openings 34 that pass through the vertical posts on the sides opposite the set of openings 32. On the mounting plate 18 on the side of the L are two openings 26 that are spaced in approximately the center as to the width of the L and in vertical alignment. The openings 26 are adapted to take a bolt 28. The openings 26 on side of the L of the mounting plates 18 are aligned so that bolts 28 can be placed through the openings 26 in the mounting plate 18 and pass through the openings 32 in the bottom of the vertical post 30 and the openings 26 in the mounting plate 18 facing it. To mount the vertical post 30 on the mounting plate 18 one places bolts 28 through the openings 26 on the mounting plate 18 and through the bottom openings 32 on the vertical post 30 and the through the openings 26 on the mounting plate 18 facing it. Nuts 34 are then applied to the bolts 28.

FIG. 5 also shows that there can be two other openings 36 in the mounting plate 18. These openings are placed toward the outside of the mounting plate 18 from the openings 26. These openings are adapted to take a rod 38. FIG. 5 only shows one rod placed through opening 36. However, the rod can actually be placed through either opening 36. The rod 38 is placed through opening 36 in one of the mounting brackets and the rod 38 is of sufficient length that it will pass through opening 36 in the mounting bracket 18 that is facing the original mounting bracket 18. To hold the rod in place a small opening 42 is adapted to take a hairpin 40 as shown in FIG. 5. The rods 38 can fit through openings 36 on either side of the vertical post 30 when the vertical post 30 is mounted in the mounting bracket 18. These rods 38 are adapted to be a further precaution to keep the vertical posts from moving backward or forward.

At the top of each vertical post 30 is a top brace opening 46. This top brace opening 46 passes through the vertical post 30 and is adapted to take a bolt 48. The top brace openings 46 are on the same side as the set of openings 32. The top brace piece 50 is of a length long enough to span the distance between the two vertical posts 30. At each end of the top brace piece 50 is an opening 48 adapted to align with the top brace opening 46 in the vertical posts. There are two top brace pieces 50. To mount these top brace pieces 50 on the bicycle rack one takes the bolt 52 and passes it through one of the openings 48 in the top brace piece 50 and through the top brace opening 46 in the top of the vertical post 30. (The bolt 52 then is passed through an opening 48 another top brace piece 50 that is placed on he other side at the vertical post 30 opening and nut 54 is tightened on the other side. The same procedure is performed on the other vertical post to form a top brace between the two vertical posts 30.

Figure 7:
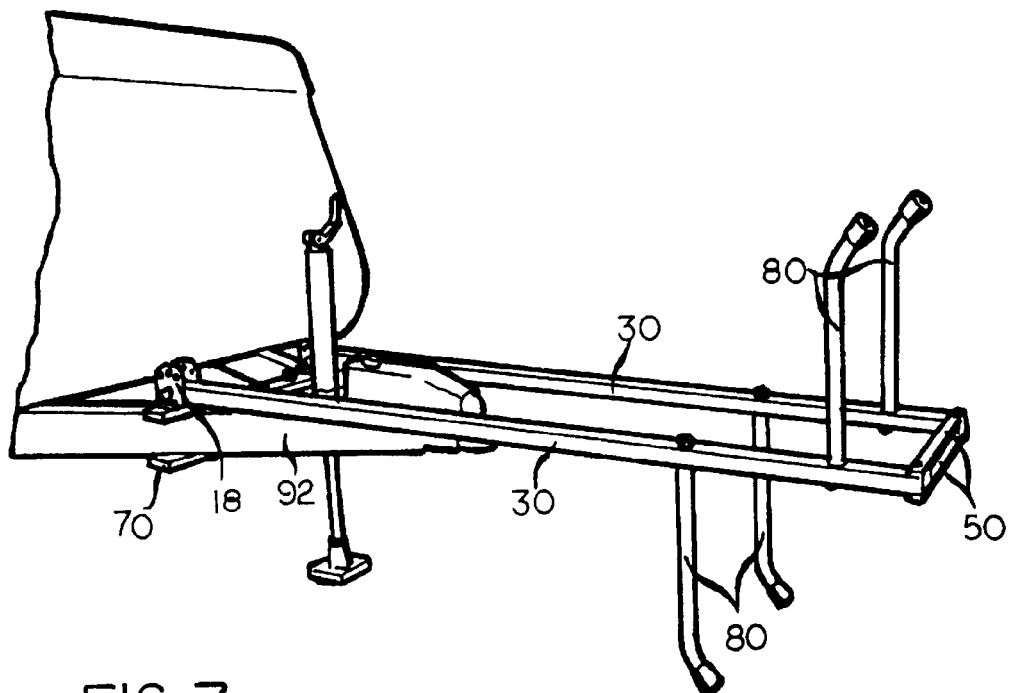
FIG. 7 is a view of the invention attached to the tent camper in the horizontal position.
Figure 8:
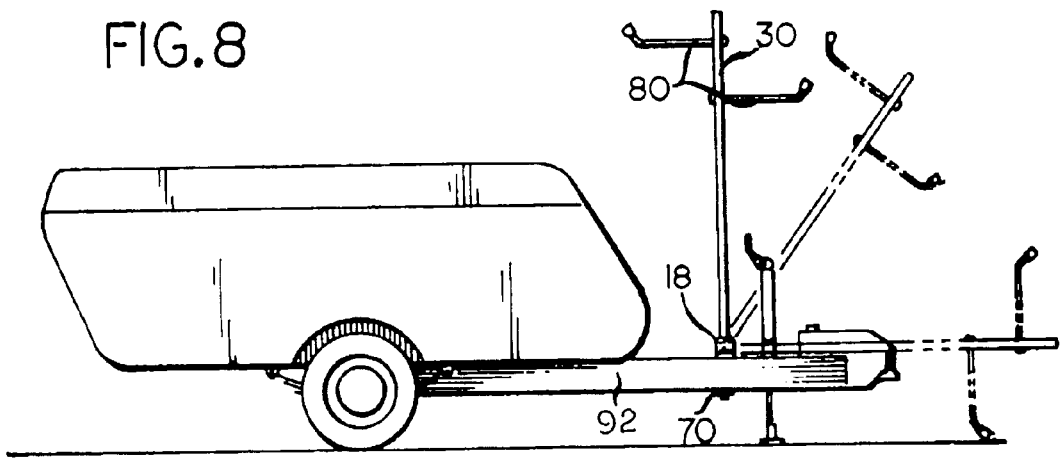
FIG. 8 is a side view of the invention attached to the tongue showing the invention as it is moved from the vertical position to the horizontal position.

FIG. 8 shows that the vertical post can be moved into a horizontal position. The rack in the horizontal position is shown in FIG. 7. The bottom 44 of vertical post 30 is mounted in the mounting brackets 18 a sufficient distance from the base plate 12 that the vertical post can be moved to the horizontal position as shown in FIG. 7 and FIG. 8. To move the vertical post to a horizontal position one removes the hairpins 40 from the small openings 42 in the rods 38 and removes the rods from the mounting bracket. One then removes nuts 34 from bolts 28 that pass through the mounting brackets 18 and the vertical posts 30. One then removes bolts 28. At that point one can easily move the bike rack from the vertical position to the horizontal position as shown in FIG. 7 and FIG. 8. It is necessary to move the bike rack from the vertical position to the horizontal position so that once one arrives at the campsite, one can put up the tent camper.

On the base plate 12 towards the center from the openings 14 are two base plate mounting bolt openings 60. These openings 10 pass through the base plate 12. Also in FIGS. 3 and 4 you can see a bottom plate 70 that is approximately the same size as the base plate 12. In the bottom plate 70 there are only two base plate mounting openings that are aligned with the two mounting openings 60 in the base plate 12. These four mounting openings are adapted to fit the large mounting bolt 66. The large mounting bolt 66 is a bolt in the preferred embodiment of 2⅝ and 7 inches long.

Attached to the vertical posts 30 are the means for mounting bicycles. In the preferred embodiment the means for mounting bicycles are ½ inch times 14 inch bike rack bolts 80 that are adapted to fit the set of openings 32 in the vertical post 30. To place these bike rack bolts 80 on the bike rack one first places the nut 82 on the bike rack bolt 80 and screws the nut 82 a sufficient distance up the bike rack bolt 80 so that the bike rack bolt 80 end that passes through the nut 82 will pass through the vertical post 30. The bike rack bolt 80 is then passed through the vertical post 30 and a second nut 84 is placed on the other end and tightened. To secure the bike better in the preferred embodiment, the end of the bike rack bolt 80 is bent at a 40 degree angle approximately 2 inches from the end of the bike rack bolt 80. There are in the prior art, many different ways to place a bicycle on a rack with two vertical posts. Any of these ways could be used to attach the bicycle to the rack.

Figure 9:
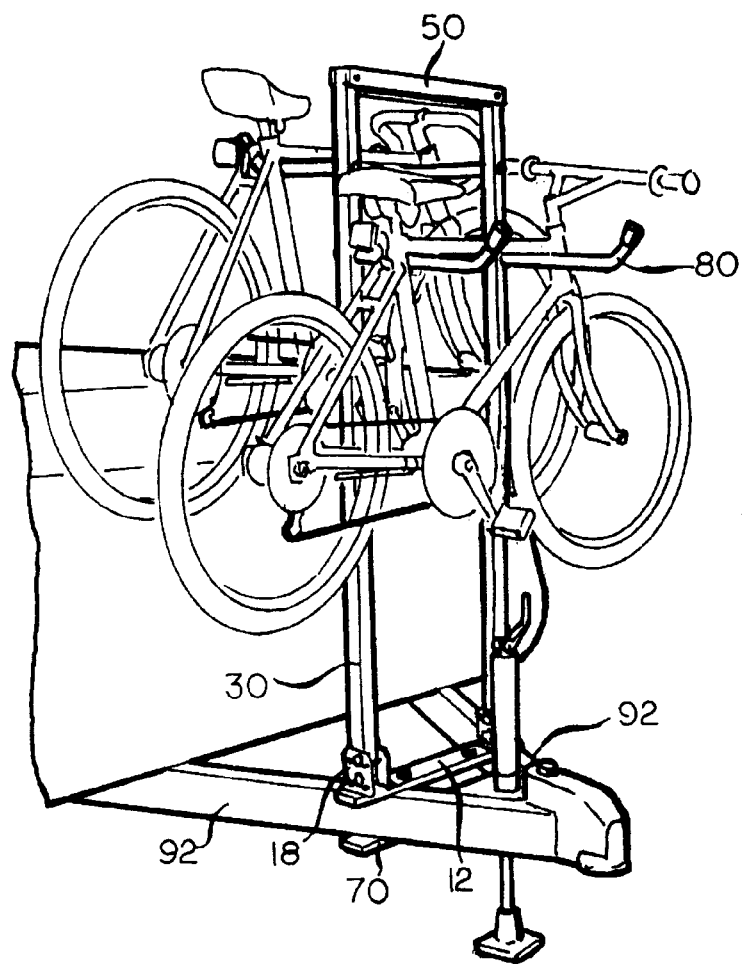
FIG. 9 is a view of the invention with the bicycles attached.

As I pointed out above and shown in FIG. 9, one of the advantages of this rack 10 is a bicycle can be placed on both sides of the rack. Thus, the bike rack bolts 80 as shown in FIG. 4 can extend out from either side of the rack.

To place the bicycle rack 10 on a tent camper tongue 90, one removes the bottom plate 70. One then takes the bicycle rack over the tongue 90 and places the bicycle rack 10 on top of the tongue 90. One then moves the bicycle rack 10 to a place on the tongue 90 in which the outer tongue support beams 92 are very near to the base plate mounting openings 60 in the base plate 12 as shown in FIG. 1. Then, underneath the tongue 90, one places the bottom plate 70 such that the mounting bolts 66 can pass through the bottom plate mounting bolt openings in the bottom plate 70. The mounting bolts 66 are then placed through the base plate 12 and the bottom plate 70. One then places the mounting nuts 68 on the mounting bolts 66 and tightens the bike rack 10 to the tent camper. The rack now is in position to have the bikes mounted on it.

To place the bikes 95 on the rack, one just places the top tube 99 of the bike 95 over the bike rack bolts 80 in both the vertical posts 30 as shown in FIG. 10.

As one can see from FIG. 8 the bike rack extends above the tent camper when the tent camper is not exposed. When one gets to the campground and needs to put the tent camper up, one simply pulls the rods 38 in the mounting plates 18. Then one removes nuts 34 from the bolts 28 in the top opening 26 of the mounting plate 18 and removes the bolts 28. Then the bike rack 10 can be moved into a horizontal position as shown in FIG. 9. One will then have enough clearance to put up the camper.

The preferred embodiment of the bike rack is made out of steel, however is could be made out of aluminum or other material that is sufficiently strong.

Changes and modifications in the specificity described embodiments can be carried out without departing from the scope of the invention which is intended to limited only by the scope of the appending claims.

I claim:

1. A bike rack for a tent camper with a tongue comprising:
   a. a top rail that fits on top of the tongue with openings; and,
   b. a bottom rail that fits on the bottom of the tongue with openings that aligns with the openings in the top rail; and,
   c. bolts that are adapted to fit through the openings in the top rail and through the openings in the bottom rail; and,
   d. Nuts that are adapted to fit on the end of the bolts and tighten the top and bottom rail against the tongue of the tent camper; and,
   e. two vertical posts, each with a set of openings; and,
   f. four L shaped mounting brackets that mount in pairs at the two ends of the top rail and said mounting bracket pairs are mounted a sufficient distance apart that the vertical posts can be placed between them; and,
   g. the four L shaped mounting brackets each have openings in the horizontal portion and the two openings vertical portion; and,
   h. openings in the top rail which when the L shaped mounting brackets are placed on the top rail in pairs and the pairs of L shaped mounting brackets are spaced such that they have approximately the width of the vertical post between each member of a pair, said openings in the top rail align with said opening in the horizontal portion of the L shaped mounting brackets; and, i. rail bolts that pass through the openings in the L shaped mounting brackets and the through the opening in the top rail and tighten the L shaped mounting brackets against the top rail with nuts; and, j. two openings in each of the vertical posts that when each of the vertical posts are placed between one of the pairs of L shaped mounting brackets, said openings in the vertical posts correspond with the openings in the L shaped mounting brackets; and k. two vertical post bolts for each vertical post that pass through the openings in the vertical portions of the L shaped mounting brackets and through the vertical post and hold the vertical post in between the L shaped mounting brackets; and l. rods that fit within the set of openings and extend from the vertical post horizontally and are adapted such that a bicycle can be placed on said rods and held in position; and, m. a means for lowering the two vertical posts so that the tent camper can be expanded.

2. A bike rack for a tent camper with a tongue as in claim 1 wherein: the means for lowering the two vertical posts so that the tent camper can be expanded is that in each vertical post, one of the vertical post bolt is higher than the other and said higher bolt is removed and the vertical post can than rotate around the other bolt.

3. A bike rack for a tent camper with a tongue as in claim 1 further comprising:

a. pin openings in each of the vertical portion of the L shaped mounting brackets between the two openings in the vertical portion of the L shaped mounting brackets; and, b. a pin that passes through the both pin openings in each of the pairs of L shaped mounting brackets but not through the vertical post.

4. A bicycle rack as in claim 1 further comprising:

a. a means for bracing the two vertical posts.

5. A bicycle rack as in claim 4 wherein:

a. the means for bracing is a rod attached to the top of each of the vertical posts.

* * * * *